(12) United States Patent
Reddy et al.

(10) Patent No.: US 11,456,938 B2
(45) Date of Patent: Sep. 27, 2022

(54) QUANTIFYING PERFORMANCE OF A CONNECTION BY MONITORING DUPLICATE ACKNOWLEDGEMENT NUMBERS

(71) Applicant: Arista Networks, Inc., Santa Clara, CA (US)

(72) Inventors: Bachu Rikith Reddy, Pune (IN); Karan Gupta, Pune (IN)

(73) Assignee: ARISTA NETWORKS, INC., Santa Clara, CA (US)

( * ) Notice: Subject to any disclaimer, the term of this patent is extended or adjusted under 35 U.S.C. 154(b) by 40 days.

(21) Appl. No.: 16/582,298

(22) Filed: Sep. 25, 2019

(65) Prior Publication Data

US 2021/0092034 A1    Mar. 25, 2021

(51) Int. Cl.
*H04L 43/0829* (2022.01)
*H04L 43/0811* (2022.01)
*H04L 43/16* (2022.01)
*H04L 5/00* (2006.01)

(52) U.S. Cl.
CPC ........ *H04L 43/0829* (2013.01); *H04L 5/0055* (2013.01); *H04L 43/0811* (2013.01); *H04L 43/16* (2013.01)

(58) Field of Classification Search
CPC .............. H04L 43/0829; H04L 5/0055; H04L 43/0811; H04L 43/16
See application file for complete search history.

(56) References Cited

U.S. PATENT DOCUMENTS

| | | | |
|---|---|---|---|
| 2003/0161321 A1* | 8/2003 | Karam | H04L 45/124 370/395.21 |
| 2007/0280107 A1* | 12/2007 | Ludwig | H04L 1/0002 370/230 |
| 2008/0037420 A1* | 2/2008 | Tang | H04L 1/1607 370/229 |
| 2011/0069632 A1* | 3/2011 | Chen | H04L 43/026 370/253 |

(Continued)

OTHER PUBLICATIONS

RFC 1122—Requirements for Internet Hosts—Communication Layer, Internet Engineering Task Force R. Braden, Editor Oct. 1989, Retrieved from:https://tools.ietf.org/html/rfc1122#page-96.

(Continued)

*Primary Examiner* — Sharmin Chowdhury
(74) *Attorney, Agent, or Firm* — Fountainhead Law Group P.C.

(57) ABSTRACT

In some embodiments, a method receives a first acknowledgement message that acknowledges receipt of a first packet and determines whether the first acknowledgement message is a duplicate of a previous acknowledgement message that was sent previous to the first acknowledgement message. When the first acknowledgement message is the duplicate of the previous acknowledgement message, the method detects when a second acknowledge message is received that acknowledges receipt of a second packet. Then, the method determines that the second acknowledgement message is not the duplicate of the previous acknowledgement message and measures a metric based on the detecting of the first acknowledgement message and the second acknowledgement message.

18 Claims, 11 Drawing Sheets

(56) References Cited

U.S. PATENT DOCUMENTS

| | | | | |
|---|---|---|---|---|
| 2012/0287814 A1* | 11/2012 | Roberts | .............. | H04L 43/0876 |
| | | | | 370/253 |
| 2014/0064119 A1* | 3/2014 | Iizuka | ................ | H04L 43/0829 |
| | | | | 370/252 |
| 2014/0269269 A1* | 9/2014 | Kowali | ................ | H04W 24/04 |
| | | | | 370/229 |
| 2014/0286258 A1* | 9/2014 | Chowdhury | ............ | H04L 1/188 |
| | | | | 370/329 |
| 2015/0271041 A1* | 9/2015 | Odell | ................... | H04L 1/1858 |
| | | | | 370/252 |
| 2015/0319064 A1* | 11/2015 | Oishi | ..................... | H04L 1/203 |
| | | | | 370/241.1 |
| 2016/0173387 A1* | 6/2016 | Chandrayana | .......... | H04L 67/28 |
| | | | | 370/231 |
| 2020/0267083 A1* | 8/2020 | Osuga | ................ | H04L 43/0876 |
| 2020/0404536 A1* | 12/2020 | Han | ..................... | H04L 47/193 |

OTHER PUBLICATIONS

TCP Variations: Tahoe, Reno, New Reno, Vegas, Sack, by Paul D. Amer, Professor. Computer & Information Sciences, University of Delaware. Presented Sep. 10, 2002.

\* cited by examiner

| ACK received | Previous ACK | Time Stamp |
|---|---|---|
| 2 | NA | T2 |
| 3 | 2 | T4 |
| 3 | 3 | T6 |
| 3 | 3 | T8 |
| 6 | 3 | T10 |

FIG. 4

| Timestamp | Node #2 | | | Node #1 | | |
|---|---|---|---|---|---|---|
| | Current | Previous | Expected | Current | Previous | Expected |
| T1 | 1 | NA | NA | NA | NA | 2 |
| T2 | NA | 1 | 1 | 2 | NA | 2 |
| T3 | 1 | 1 | 1 | NA | 2 | 3 |
| T4 | NA | 1 | 1 | 3 | 2 | 3 |
| T5 | 1 | 1 | 1 | NA | 3 | 4 |
| T6 | NA | 1 | 1 | 3 | 3 | 4 |
| T7 | 1 | 1 | 1 | NA | 3 | 5 |
| T8 | NA | 1 | 1 | 3 | 3 | 5 |
| T9 | 1 | 1 | 1 | NA | 3 | 6 |
| T10 | NA | 1 | 1 | 6 | 3 | 6 |

QUANTIFYING PERFORMANCE OF A CONNECTION BY MONITORING DUPLICATE ACKNOWLEDGEMENT NUMBERS

BACKGROUND

In a connection between a first node and a second node, such as a client and a server, either node may send packets to the other node. The first node and the second node may use a protocol that sends multiple packets without waiting for an acknowledgement (ACK) for each packet, such as a pipelined protocol or sliding window protocol. A pipelined protocol may require acknowledgement of packets that are sent and include protocols such as Transfer Control Protocol (TCP). The protocol may be used by an application running over HyperText Transfer Protocol (HTTP), remote desktop applications, or by other applications.

Packets may be lost when the first node and the second node communicate. However, because the protocol is a reliable protocol, the connection may recover from the lost packets due to one of the nodes not receiving an acknowledgement of a lost packet. Once detecting the lost packet, a node can deliver the packets that were lost. This means a node may eventually receive the data; however, it is hard for an administrator to detect when the problem is occurring in the connection and also how to quantify the problem.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 4 depicts a table showing the acknowledgement number received and the previous acknowledgement number being stored by a flow analyzer according to some embodiments.

FIG. 6 depicts a table that summarizes the state of a current acknowledgement number, a previous acknowledgement number, and an expected acknowledgement number according to some embodiments.

DETAILED DESCRIPTION

Figure 1:
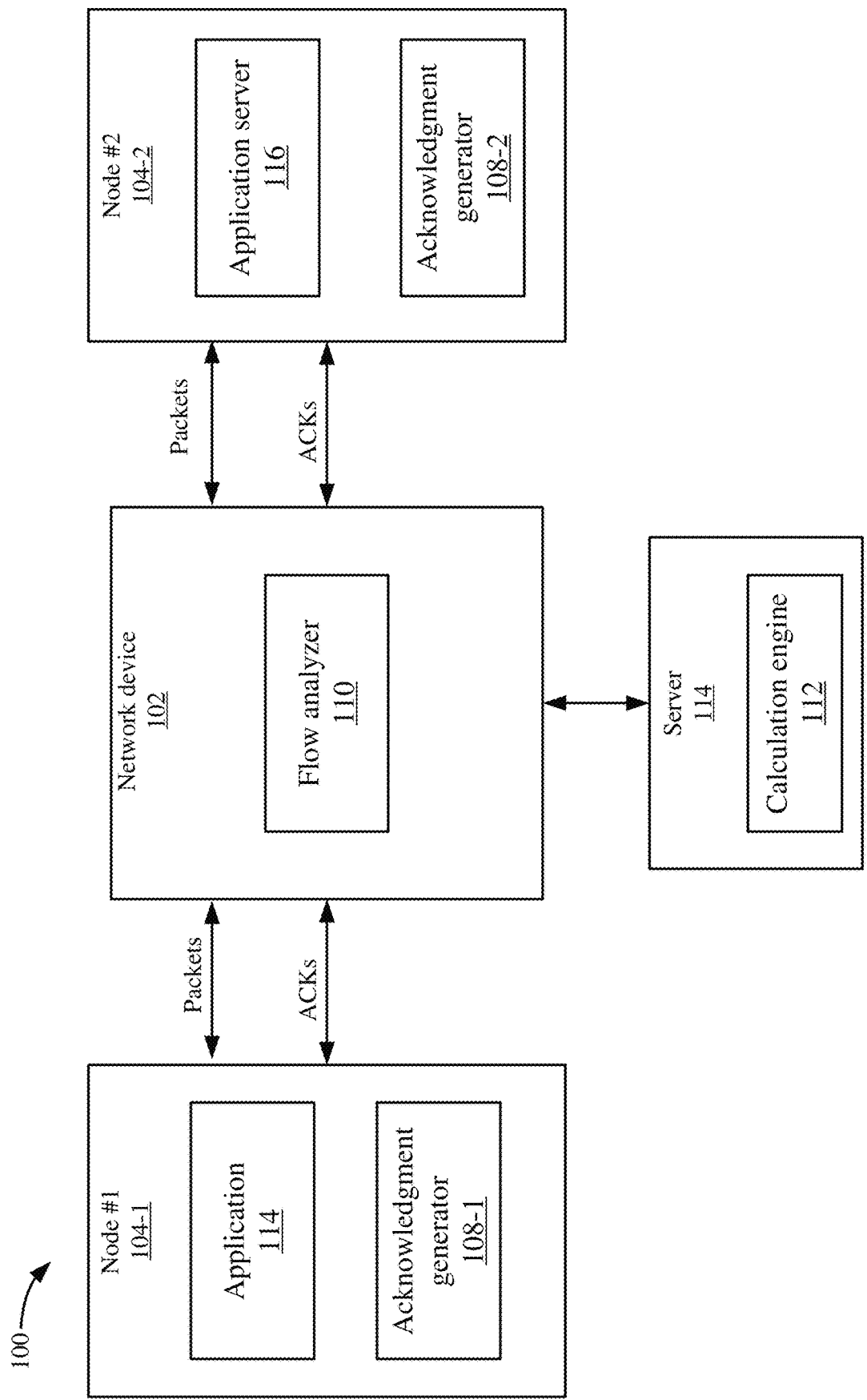
FIG. 1 depicts a simplified system for quantifying the performance of a connection according to some embodiments.

Described herein are techniques for a communication system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments quantify a performance of a connection between a first node and a second node based on a measured metric. For example, the first node may be running an application that communicates with a second node that may be a server. The connection may also be bi-directional. For example, the application may download information from the second node and the application may upload information to the second node.

A network device that sits in between the first node and the second node may analyze the performance of the connection between the first node and the second node. The network device may leverage the protocol that the first node and the second node are using to send packets to analyze the performance of the connection. For example, as discussed above, a protocol that sends multiple packets without waiting for an ACK for each packet, such as a pipelined protocol or sliding window protocol, may be used. The network device uses characteristics of the acknowledgement messages to measure the performance of the connection.

In one scenario, when a first node receives a packet from a second node, the first node sends a first acknowledgement message that acknowledges receipt of a first packet. The network device receives the first acknowledgement message and determines whether the first acknowledgement message is a duplicate of a previous acknowledgement message. In some embodiments, an acknowledgement message includes an acknowledgement number that is a value equal to all the data that is received during a connection plus an expected amount of data in the next communication. If the first acknowledgement message includes an acknowledgement number that is equal to a previous acknowledgement number, this is called the duplicate acknowledgement message and the network device uses the duplicate acknowledgement message to identify that a packet has been lost. For example, if there is a gap in the transmitted packets possibly due to a packet drop in the network, the first node would advertise the acknowledgement number equal to the start of the gap.

When the first acknowledgement message is a duplicate of the previous acknowledgement message, the network device detects when a second acknowledgement message is received that acknowledges receipt of a second packet that is not a duplicate acknowledgement message. In analyzing the acknowledgement number of the second packet, the network device determines that the second acknowledgement message is not the duplicate of the previous acknowledgement message because the acknowledgement number of the second acknowledgement message is higher than the acknowledgement number of the previous acknowledgement message. At this point, the network device may determine that the second node has detected the lost packet and re-sent the lost packet to the first node. Then, using the second acknowledgement message, the first node has acknowledged the receipt of the lost packet. At this point, the network device can measure a metric based on detecting the first acknowledgement message and the second acknowledgement message. For example, the network device can measure the recovery time to receive a lost packet based on a time between the network device receiving the duplicate acknowledgement message and receiving the second acknowledgement message for the re-sent lost packet.

System Overview

FIG. 1 depicts a simplified system 100 for quantifying the performance of a connection according to some embodiments. System 100 includes a first node #1 104-1 and a second node #2 104-2. Node #1 104-1 and node #2 104-2 may communicate via a network device 102. Although network device 102 is described as being separate from node #1 104-1 and node #2 104-2, the functions of network device 102 may be performed on node #1 104-1 and/or node #2 104-2. For example, the functions described with respect to network device 102 may be distributed to node #1 104-1, node #2 104-2, or distributed among node #1 104-1, node #2 104-2, and/or network device 102. However, in some embodiments, network device 102 is separate from node #1 104-1 and node #2 104-2, which allows the following process to be performed without modification of node #1 104-1 and node #2 104-2. In some examples, network device 102 is positioned in a network, such as a local area network that includes either node #1 104-1 or node #2 104-2. The position may be where network device 102 can receive all packets and acknowledgement messages sent between node #1 104-1 and node #2 104-2. For example, network device 102 is positioned at the edge of the network in a network device, such an access point (e.g., a WiFi access point).

In some embodiments, node #1 104-1 may be running an application 114 that may download information from an application server 116 running on node #2 104-2. Application 114 and application server 116 communicate to transfer data in packets. Also, in some embodiments, node #1 104-1 may be referred to as the client, and node #2 104-2 may be referred to as the server. However, both node #1 104-1 and node #2 104-2 may send packets that are acknowledged by the other node.

Network device 102 may include a flow analyzer 110, which may analyze the flow of packets and the acknowledgement messages (ACKs) that are sent between node #1 104-1 and node #2 104-2. As discussed above, network device 102 may be positioned in the network to receive the packets and acknowledgement messages sent between node #1 104-1 and node #2 104-2.

In a flow, node #2 104-2 may send a packet (of multiple packets in a window) to node #1 104-1. When node #1 104-1 receives the packet, an acknowledgement generator 108-1 generates an acknowledgement message and sends the acknowledgement message back to node #2 104-2. Node #1 104-1 and Node #2 104-2 may maintain a sequence number, such as a 32-bit sequence number that is used to keep track of how much data has been sent in the connection. The sequence number is included on each transmitted packet and acknowledged by the other node as an acknowledgement number to inform the sending node that the transmitted data was received successfully. The receiving node always sends an acknowledgement number that is equal to the next sequence number that the receiving node is expecting in the next packet. In other embodiments, the acknowledgement number may be equal to all of the data that node has received during a connection or may be another number, but that number is based on the amount of data received during a connection. So, as more data is properly received in sequence in a connection, the acknowledgement number increases. Using this process, if there is a gap in the transmitted data packets possibly due to a packet loss in the network, the receiver node would send an acknowledgement message with an acknowledgement number equal to the start of the gap. The duplicate acknowledgement message includes an acknowledgement number that is a duplicate of a previously-sent acknowledgement message.

Network device 102 may receive both the packet and the acknowledgement message, and analyze the acknowledgement number in the acknowledgement message. Flow analyzer 110 detects when a duplicate acknowledgement message is sent to identify when a packet is lost. Upon detection, flow analyzer 110 may measure a metric until flow analyzer 110 detects that the lost packet has been resent and acknowledged. For example, flow analyzer 110 may calculate the recovery time that it takes to recover from a lost packet using the acknowledgement messages that are received at network device 102.

Flow analyzer 110 may send the measured metrics to a server 114. A calculation engine 112 at server 114 may then process the metrics. For example, calculation engine 112 may aggregate recovery times for one or more flows. Although calculation engine is shown in server 114, calculation engine 114 may be present in other devices and locations, such as in network device 102. Calculation engine 112 can also expose the metrics as an application programming interface (API), expose the metrics through a user interface (UI), or output the metrics to another system.

Flow Analysis

Figure 2:
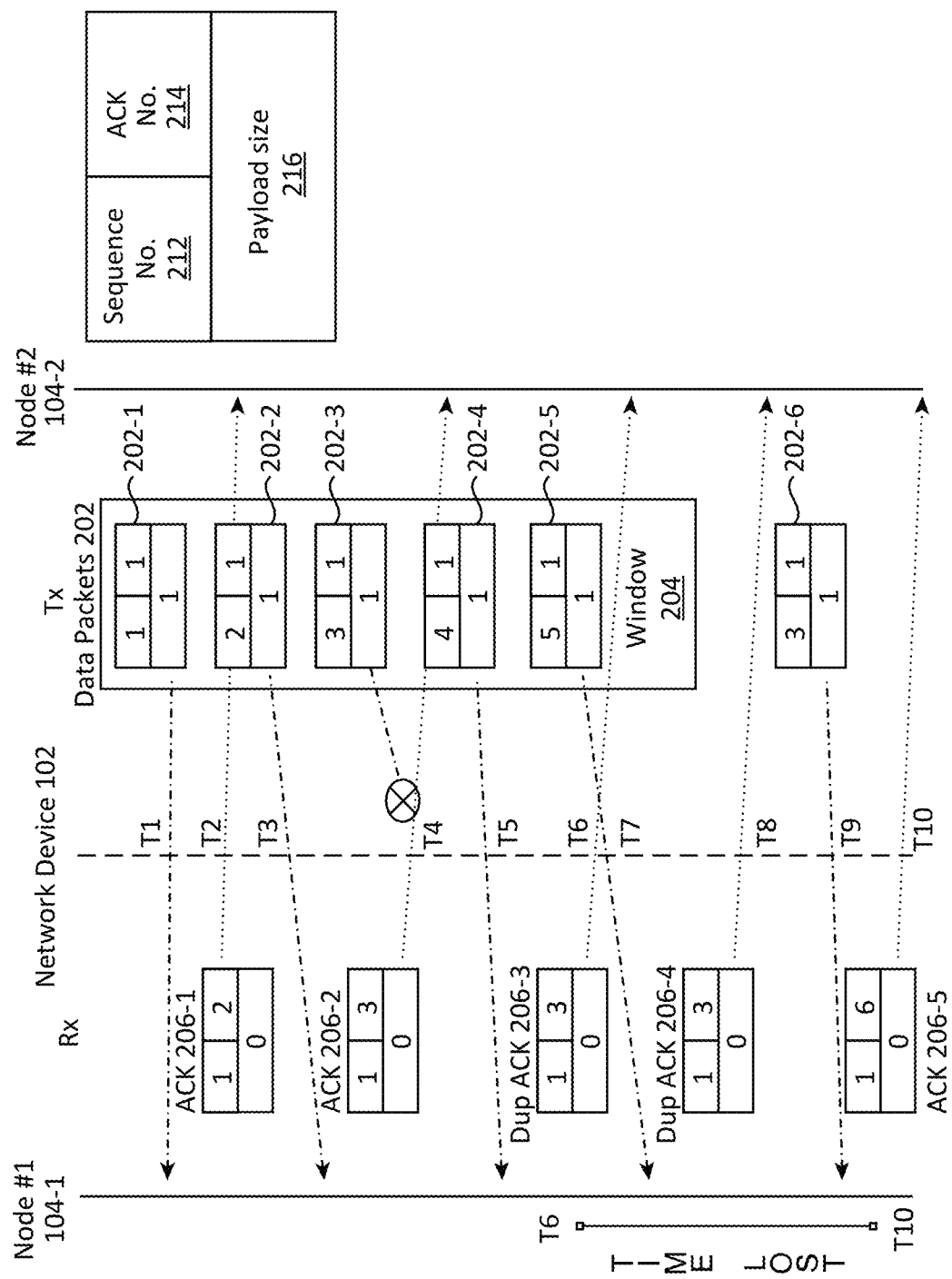
FIG. 2 depicts a flow diagram of the flow analysis according to some embodiments.

FIG. 2 depicts a flow diagram of the flow analysis according to some embodiments. Although this flow is described, other flows may be appreciated. For example, node #1 104-1 may send packets to node #2 104-2, which are acknowledged by node #2 104-2. In FIG. 2, node #1 104-1 may be retrieving a file from node #2 104-2, but other communications may be appreciated.

In this flow, node #2 104-2 is sending data packets 202 in a window 204, such as a transfer control protocol (TCP) window, to node #1 104-1. The packets flow through the network device 102. Then, node #1 104-1 sends acknowledgement messages 206 back to node #2 104-2 when packets are received. The acknowledgement messages also flow through network device 102. For discussion purposes, it is assumed that node #1 104-1 and node #2 104-2 have established a connection, such as a TCP connection, and the TCP segment lengths are equal to one data unit. Each data packet is represented by a sequence number, acknowledgement number, and payload size. As discussed above, the sequence number can be used to keep track of how much data has been sent. The acknowledgement number acknowledges how much data has been received successfully, and the payload size is how much data has been included in the packet. The payload size is one segment length in this example, but may be other lengths.

Node #2 104-2 may send data packets 202 in window 204, which is a size of five packets in this example, but may be other sizes. Window 204 is used to represent the number of packets that node #2 104-2 may send without requiring any acknowledgement. For example, node #2 104-2 may send the five data packets shown in window 204 without the need for receiving acknowledgement messages for a packet in the five packets. However, to proceed to a next packet after sending a number of packets equal to the window, node #2 104-2 waits to receive acknowledgement messages for one or more of the five packets in the window. Once one or more of the five packets in the window have been acknowledged, node #2 may now send more packets until the window size is reached.

Node #2 104-2 sends a first data packet 202-1 to node #1 104-1. Network device 102 may receive first data packet 202-1 at a time T1. It is noted the times described may be the time network device 102 received the packet, or another time, such as when a node sent the packet. Each data packet 202 and acknowledgement message 206 may include a sequence number 212, acknowledgement number 214, and a payload size 216 as shown. Data packet 202-1 includes a sequence number 212 of "1", an acknowledgement number 214 of "1" and a payload size 216 of "1".

When node #1 104-1 receives packet 202-1, node #1 104-1 generates an acknowledgement message 206-1. Acknowledgement message 206-1 includes a sequence number of "1". The acknowledgement number is "2", which may be the next sequence number that node #1 104-1 is expecting in the next packet and is based on node #1 104-1 receiving one data unit. That is, in this example, node #1 104-1 has received one data unit and is expecting a second data unit next. The acknowledgement message also includes a payload of "0" units, but may include data in the payload. The acknowledgement messages sent by node #1 104-1 do not increment the sequence number or include any payload.

Network device 102 receives acknowledgement message 206-1 at time T2. Network device 102 determines that acknowledgement message 206-1 is not a duplicate acknowledgement message. Node #2 104-2 receives acknowledgement message 206-1 also.

Node #2 104-2 generates packet 202-2 and sends packet 202-2 to node #1 104-1 through network device 102 at time T3. Packet 202-2 includes a sequence number of "2". When node #1 104-1 receives packet 202-2, node #1 104-1 recognizes the sequence number is the next packet in a sequence and node #1 104-1 sends acknowledgement message 206-2. Acknowledgement message 206-2 includes acknowledgement number 214 of "3", which is the acknowledgement number that acknowledges all previous data packets. Network device 102 receives acknowledgement message 206-2 at time T4, and node #2 104-2 receives acknowledgement message 206-2 thereafter.

Node #2 104-2 also generates packet 202-3 with a sequence number 212 of "3". However, packet 202-3 is not received by node #1 104-1, such as packet 202-3 is lost in the network.

Node #2 104-2 continues to generate packets in window 204 without the need to receive an acknowledgement message for lost packet 202-3. For example, node #2 104-2 generates packet 202-4 with a sequence number 212 of "4". Network device 102 receives packet 202-4 at a time T5, and node #1 104-1 also receives packet 202-4. When node #1 104-1 receives packet 202-4, node #1 104-1 recognizes that the sequence number 212 of "4" of packet 202-4 is not in a correct sequence from the previous packet received. That is, node #1 104-1 has not received a packet with the sequence number of "3" yet. In response, node #1 104-1 generates a duplicate acknowledgement message 206-3 that includes an acknowledgement number 214 of "3", which is the same value of the previous acknowledgement message 206-2. Node #1 104-1 sends duplicate acknowledgement message 206-3 through network device 102 at time T6 to node #2 104-2.

Meanwhile, node #2 104-2 generates packet 202-5 with a sequence number of "5". Node #2 104-2 sends packet 202-5 through network device 102 at time T7 to node #1 104-1. Similar to above, node #1 104-1 recognizes that the sequence number of "5" is not in the correct sequence of received packets in window 204, and node #1 104-1 generates another duplicate acknowledgement message 206-4 that includes an acknowledgement number 214 of "3". Node #1 104-1 sends duplicate acknowledgement message 206-4 through network device 102 to node #2 104-2 at a time T8. At some time, node #2 104-2 recognizes that packet 202-3 has not been acknowledged by node #1 104-1. For example, node #2 104-2 recognizes that duplicate acknowledgement message (either 206-3 or 206-4) has been received with an acknowledgement number 214 of "3". In another way, node #2 104-2 may use a timeout in which an acknowledgement message is not received in a set time to determine a lost packet. From the acknowledgement number, node #2 104-2 recognizes that packet 202-3 may have been lost and not received by node #1 104-1. Accordingly, node #2 104-2 generates packet 202-6 with a sequence number 212 of "3" and sends packet 202-6 via network device 102 at a time T9 to node #1 104-1.

Node #1 104-1 recognizes that all packets have been received up to a sequence number "5" and generates an acknowledgement message 206-5 with an acknowledgement number 214 of "6". Node #1 104-1 generates the acknowledgement number "6" to acknowledgement that packets 202-1 to 202-5 have all been received. Node #1 104-1 then sends acknowledgement message 206-1 via network device 102 at a time T10 to node #2 104-2. Node #1 104-1 may not generate an acknowledgement message with an acknowledgement number of "3" because packets 202-4 and 202-5 have already been received and the next sequence number that is expected is "6". That is, node #1 104-1 has received packet up to a sequence number of "5" and the next packet is expected to be a sequence number of "6" (and not "4"). However, it is possible that variations in the acknowledgment process described above may be appreciated. For example, node #1 104-1 may also send an acknowledgement message with a sequence number of "3". It is noted that the number of duplicate acknowledgement messages may vary based on when the lost packet is re-sent by node #2 104-2 and how many packets 202 are in the window 204. For example, if node #2 104-2 had re-sent the lost packet after packet 202-4, then node #1 104-1 does not generate duplicate acknowledgement message 206-4. However, in cases where packets 202-1 to 202-5 are sent in a batch, node #2 104-2 may most likely receive two duplicate acknowledgement messages. Further, if there are additional packets in window 204 after packet 202-5, node #1 104-1 may send a duplicate acknowledgement message for each additional data packet until the lost packet is re-sent by node #2 104-2.

Based on network device 102 receiving duplicate acknowledgement messages 206-3 and/or 206-4, and then acknowledgement message 206-5, network device 102 can calculate a metric that quantifies the performance of the connection, such as quantifying the recovery time from the lost packet. For example, network device 102 may calculate a time lost due to the lost packet. The time lost may be the time taken to recover from a lost packet by sending and receiving the lost packet at node #1 104-1. For example, from a time T6 to a time T10, node #1 104-1 sent duplicate acknowledgement messages until acknowledgement message 206-5 is sent. This is the amount of time that was lost due to the lost packet.

Metric Measurement

Figure 3:
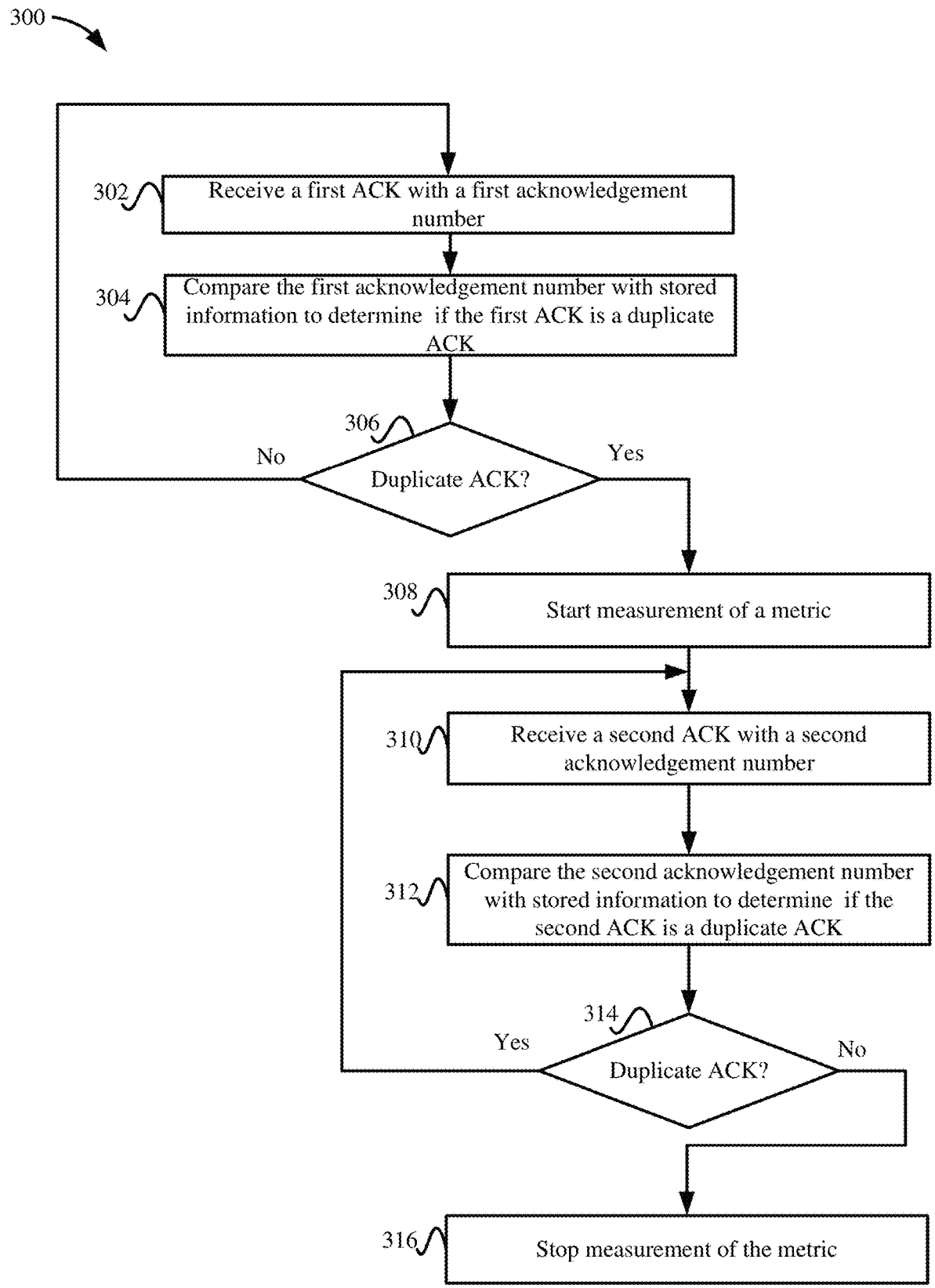
FIG. 3 depicts a simplified flowchart of a method for measuring a metric according to some embodiments.

The following will describe the flow at network device 102 to measure the metric based on the receiving of the duplicate acknowledgement message 206 according to some embodiments. FIG. 3 depicts a simplified flowchart 300 of a method for measuring a metric according to some embodiments. At 302, network device 102 receives a first acknowledgement message with a first acknowledgement number. At 304, flow analyzer 110 compares the first acknowledgement number with stored information to determine if the first acknowledgement message is a duplicate acknowledgement message. The stored information may be the previous acknowledgement number in a previous acknowledgement message received by network device 102. If the first acknowledgement number is equal to the acknowledgement number in a previous acknowledgement message, then network device 102 can determine that the first acknowledgement message is a duplicate acknowledgement message. Accordingly, at 306, flow analyzer 110 determines if the duplicate acknowledgement message has been received. If not, the process reiterates to 302 where another acknowledgement message is received and analyzed.

In this flow, it is assumed that the first acknowledgement message is a duplicate acknowledgement message. Then, at 308, flow analyzer 110 starts the measurement of a metric. In some examples, the measurement may be measuring the time lost, and flow analyzer 110 starts a timer to start measurement of the metric. However, when other metrics are being measured, flow analyzer 110 may perform other actions such as recording the receiving of the duplicate acknowledgement message as starting the measurement of the metric.

At 310, flow analyzer 110 receives a second acknowledgement message with a second acknowledgement number. At 312, flow analyzer 110 compares the second acknowledgement number with stored information to determine if the second acknowledgement message is a duplicate acknowledgement message. Based on the comparison, at 314, flow analyzer 110 determines if the second acknowledgement message is a duplicate acknowledgement message. Similar to above at 306, flow analyzer 110 is determining whether or not the second acknowledgement number is equal to the acknowledgement number of a previous acknowledgement message. This may occur as described when acknowledgement message 206-3 and acknowledgement message 206-4 are received in FIG. 2. When the duplicate acknowledgement message is received, the process reiterates to 310 where flow analyzer 110 waits for another acknowledgement message with another acknowledgement number.

When flow analyzer 110 has not received a duplicate acknowledgement message meaning that the second acknowledgement number is not equal to the acknowledgement number of a previous acknowledgement message, at 316, flow analyzer stops measurement of the metric. For example, flow analyzer 110 may stop a timer that was measuring a time to recover from a lost packet. However, other metrics may be measured, such as the number of lost packets or a number of new transmissions based on when the first acknowledgement message was received and the second acknowledgement message was received. The metric may also measure how much data was lost based on when the first acknowledgement message was received and the second acknowledgement message was received.

The following shows the acknowledgement numbers in acknowledgement messages and the comparison to the previous acknowledgement number. FIG. 4 depicts a table 400 showing the acknowledgement number received and the previous acknowledgement number being stored by flow analyzer 110 according to some embodiments. A column 402-1 summarizes an acknowledgement message received in network device 102 and a column 402-2 summarizes the previous acknowledgement message that is stored at network device 102. Column 402-3 stores the timestamp of the acknowledgement message that is received.

As shown, at 404-1, the acknowledgement number received is "3", which equals the previous acknowledgement number that was stored of "3". Additionally, at 404-2, the acknowledgement number received is "3", which equals the previous acknowledgement number of "3". In both these cases, network device 102 determines that a duplicate acknowledgement message has been sent. However, at 404-3 the acknowledgement number received is "6", which is not equal to the previous acknowledgement number stored by network device 102. At this point, network device 102 may determine that the acknowledgement number received is not a duplicate acknowledgement number. Additionally, the acknowledgement number that is received equals the amount of data that has been received by node #1 104-1, and network device 102 determines that all packets have been received by node #1 104-1 in window 204.

Metric Measurement

In some embodiments, network device 102 can approximate the time lost by analyzing the time taken to receive a non-duplicate acknowledgement message with an appropriate acknowledgement number that acknowledges all the data received after detecting the first duplicate acknowledgement message. Network device 102 may calculate a recovery time using the following, but other calculations may be used: Recovery time=timestamp when increased acknowledgement number is received−timestamp of first duplicate acknowledgement number is received. In the example of FIG. 4, the Recovery time=the timestamp of T10−the time stamp of T6.

Flow analyzer 110 may operate at the flow level. To detect a flow, flow analyzer 110 may use identification information that defines a flow, such as a source address, a destination address, a source port, and a destination port ([SRC_IP, DST_IP, SRC_Port, DST_Port]). In the above communication, the source address may be a source IP address of node #2 104-2 and the source port may be the port in which the packet is sent from node #2 104-2. The destination IP address may be the destination IP address of node #1 104-1 and destination port may be the port in which the packet is received at node #1 104-1.

Flow analyzer 110 may maintain a number of variables to detect a duplicate acknowledgement message in each direction. In some embodiments, flow analyzer 110 maintains the following variables:

expected_ack_number
previous_ack_number
current_ack_number
hole_detected_flag

The previous acknowledgement number previous_ack_number is the previous acknowledgement number received in a previous acknowledgement message. The current acknowledgement number is the acknowledgement number present in an acknowledgement message that is being processed. A hole-detected flag is a flag that indicates that duplicate acknowledgement message has been received resulting in a hole in the current direction, which means a packet has been lost. The expected acknowledgement number expected_ack_number may be used when a connection sends only data frames from one side and receives acknowledgement messages from another and also when multiple losses are experienced in window 204. The acknowledgement numbers on the data frames may always be the same because no payload has been sent in the data packet, which results in an acknowledgement number that has not been increased in an acknowledgement message. Without using the expected acknowledgement number, flow analyzer 110 may falsely classify an acknowledgement message as a duplicate acknowledgement message. Flow analyzer 110 calculates the expected acknowledgement number based on the amount of data the receiving node is expecting. If flow analyzer 110 determines that the acknowledgement number received is equal to the expected acknowledgement number, then flow analyzer 110 can determine that the acknowledgement message is not a duplicate acknowledgement message. Flow analyzer 110 may calculate the expected acknowledgement number value as the current frame sequence number plus the payload length (current_frame_sequence_number+Payload_length).

Figure 5:
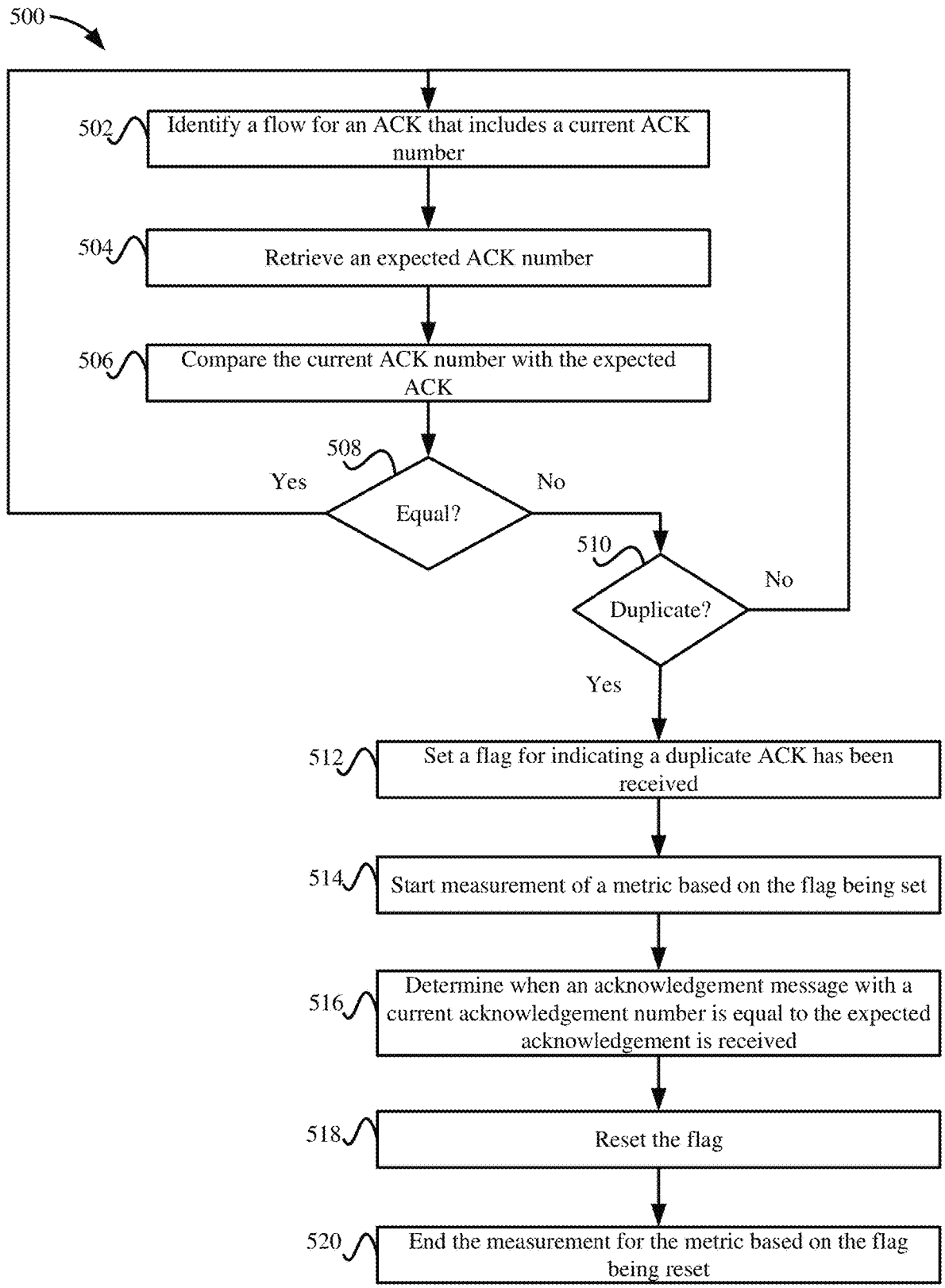
FIG. 5 depicts a simplified flowchart that uses the expected acknowledgement number and the other variables according to some embodiments.

FIG. 5 depicts a simplified flowchart 500 that uses the expected acknowledgement number and the other variables according to some embodiments. At 502, flow analyzer 110 identifies a flow for an acknowledgement message that includes a current acknowledgement number. Flow analyzer 110 may use the source address, the destination address, the source port, and the destination port to identify the flow.

At 504, flow analyzer 110 retrieves an expected acknowledgement number. Then, at 506, flow analyzer 110 compares the current acknowledgement number with the expected acknowledgement number. At 508, flow analyzer 110 determines if the current acknowledgement number is equal to the expected acknowledgement number. If so, then flow analyzer 110 can determine that the current acknowledgement number is not a duplicate because the acknowledgement number is the value that is expected. The process can then reiterate to 502 to wait for another acknowledgement message to be received. However, if the current acknowledgement number is not equal to the expected acknowledgement number, then at 510, flow analyzer 110 determines if the current acknowledgement message is a duplicate acknowledgement message. For example, flow analyzer 110 may perform the process described in FIG. 3 and compares the current acknowledgement number current_ack_number to the previous acknowledgement number previous_ack_number.

If the acknowledgement message is not a duplicate acknowledgement message, the process reiterates to 502 to wait for another acknowledgement message. However, if the acknowledgement message is a duplicate acknowledgement message, at 512, flow analyzer 110 sets a flag indicating a duplicate acknowledgement message has been received. For example, flow analyzer 110 sets a hole detected flag hole_detected_flag. Then, at 514, flow analyzer 110 starts measurement of a metric based on the flag being set.

At 516, flow analyzer 110 determines when an acknowledgement message with a current acknowledgement number is equal to the expected acknowledgement is received. At this point, at 518, flow analyzer 110 can determine that a lost packet has been received. Then, at 520, flow analyzer 110 resets the flag. At 522, flow analyzer 110 ends the measurement for the metric based on the flag being reset.

FIG. 6 depicts a table 600 that summarizes the state of the current acknowledgement number, the previous acknowledgement number, and the expected acknowledgement number according to some embodiments. Column 602-1 shows the timestamp for an acknowledgement message. Columns 602-2 to 602-4 show the acknowledgement messages sent by node #2 104-2 and columns 602-5 to 602-7 show the acknowledgement messages sent by node #1 104-1. In this example, bi-directional communication is occurring.

At times T3, T5, T7, and T9, if the expected acknowledgement number was not used, flow analyzer 110 would have determined that a duplicate acknowledgement message was sent at node #2 104-2 because the current acknowledgement number is equal to "1" and the previous acknowledgement number is equal to "1". However, this is not a case where a duplicate acknowledgement message has been sent as the packets that were sent by node #1 104-1 did not have any payload. The expected acknowledgement number of "1" thus determines that node #1 104-1 has not sent a duplicate acknowledgement message.

At time T6, node #1 104-1 has sent an acknowledgment message that has a current acknowledgement number that is not equal to the expected acknowledgement number. Additionally, the current acknowledgement number is equal to the previous acknowledgement number of "3" and network device 102 determines this acknowledgement message is a duplicate acknowledgement message.

Flow Description

In some embodiments, multiple flows may exist between node #1 104-1 and node #2 104-2. In those flows, there may be idle time in which data is not being transferred. However, in other embodiments, there may not be any idle time between the data transfers. However, if there is some idle time, flow analyzer 110 may calculate the amount of idle time. Instead of comparing recovery time to the time the connection was open, this enables a comparison of the recovery time with the time the connection was actually used for communication (connection open time–idle time). This provides the amount of productive time lost.

Figure 7A:
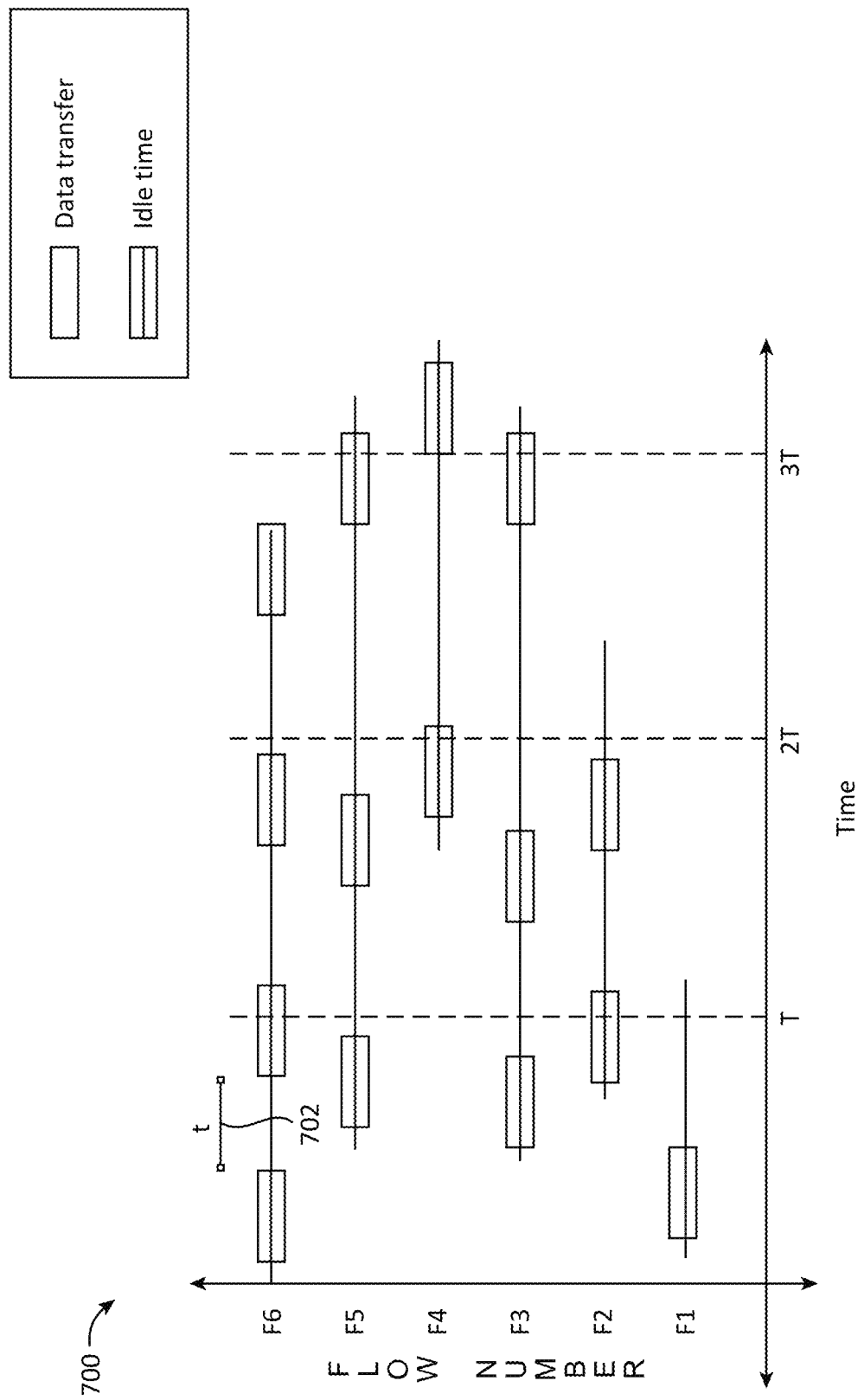
FIG. 7A depicts a graph showing the flows between a node #1 and a node #2 according to some embodiments.

FIG. 7A depicts a graph 700 showing the flows between node #1 104-1 and node #2 104-2 according to some embodiments. In some embodiments, an application 114 may generate one or more connections to retrieve data from node #2 104-2, such as a website may generate one or more TCP connections to retrieve data required for the client from the server. For example, node #1 104-1 may create N flows shown as F1, F2, F3, . . . F6. When a web page is displayed, actions from a user may not always be received, such as user may be reading information on a displayed web page without taking any actions that require communication between nodes. At some point, the node may receive a user selection of an object on the page at a random time T that requires communication. During some of that time before the user selected the object on the page, there may have been idle time in which there is no network activity. That is, when some selections are performed, an asynchronous call is made, which leads to data transfer, but when no selections are being made, data may not be transferred.

In chart 700, flows F1 to F6 are shown. Data transfers are shown in the boxes in each flow. However, in between the boxes, idle time is present in which there is no communication. Flow analyzer 110 may analyze the time between data transfers and determine that at least some of these times are idle times. For example, at 702, flow analyzer 110 approximates an idle time equal to a time interval t.

Figure 7B:
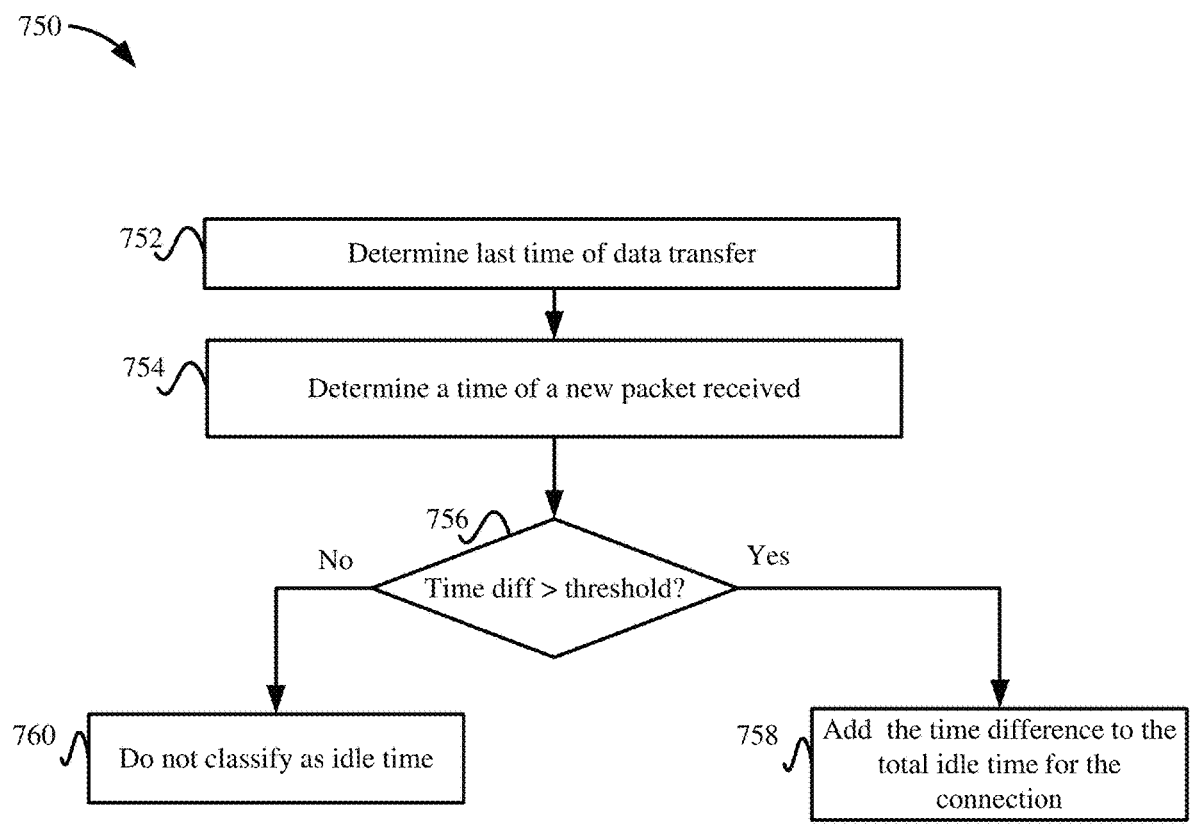
FIG. 7B depicts a simplified flowchart of a method for detecting an idle time according to some embodiments.

FIG. 7B depicts a simplified flowchart 750 of a method for detecting an idle time according to some embodiments. At 752, flow analyzer 110 determines a last time of data transfer. At 754, flow analyzer 110 determines a time of a new packet received. At 756, flow analyzer 110 determines if a time difference is greater than a threshold. If so, at 758, flow analyzer 110 adds the time difference to the total idle time for the connection. If not, at 760, flow analyzer 110 does not classify the time as idle time. In some embodiments, the threshold may be X milliseconds. In some embodiments, X may be 500 milliseconds when a standard or protocol specification says that there should be an acknowledgement message between data packets at least every 500 milliseconds, but other values may be used.

Flow analyzer 110 may maintain the following variables for each flow: [app_id, src_ip, dst_ip, src_port, dst_Port, client_mac, rx_recovery time, rx_recovery_time, total_time, idle_time, flow_start_time]. The application ID app_id is an identifier to specify to which application the flow belongs. The client MAC address client_mac is node MAC address, such as the MAC address of node #1 104-1; the receiver (e.g., the node receiving the packet) recovery time rx_recovery time is a recovery time for packets that are received; the tx_recovery_time is the recovery time for packets that are sent (e.g., transmitted by a node); the total time_total time is the total time in which the flow is open; the idle time idle_time is the total idle time for the flow; and the flow start time flow_start_time is the start time of the flow.

Figure 8:
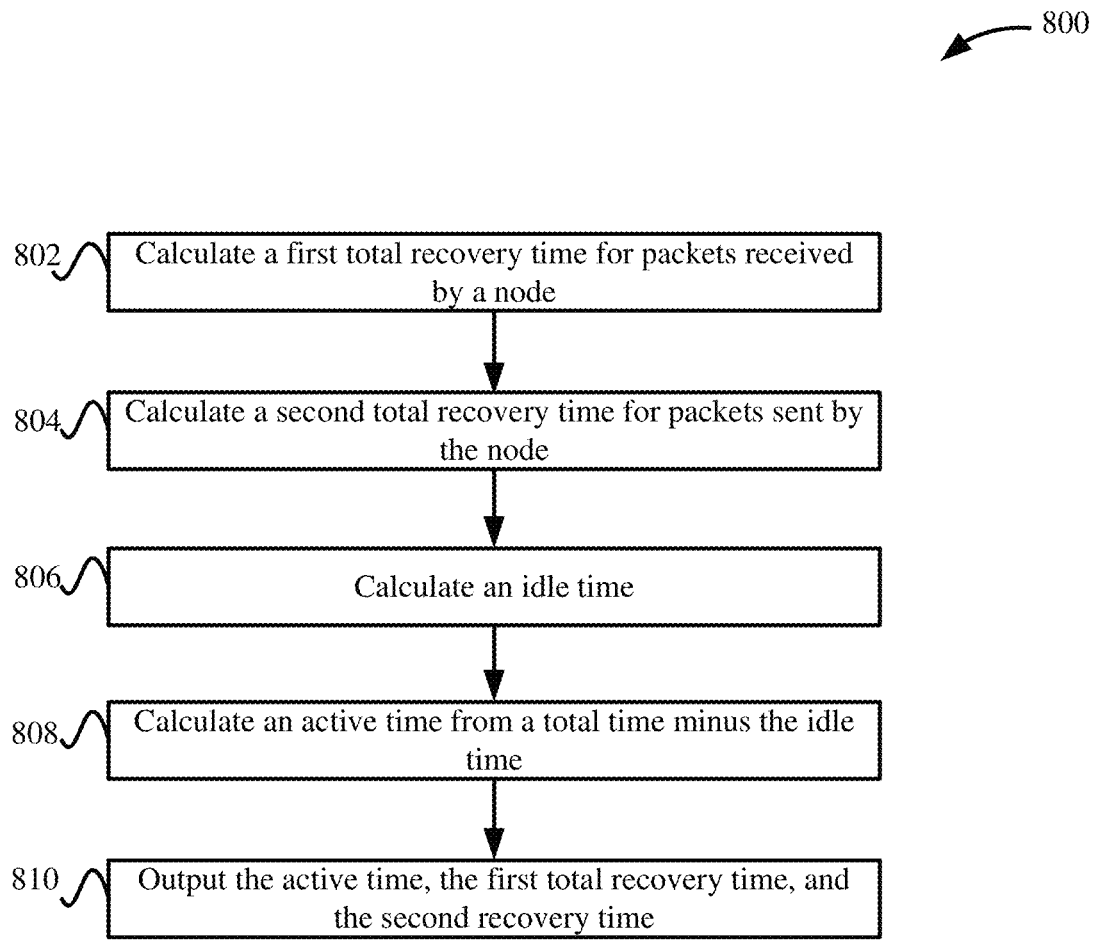
FIG. 8 depicts an example of calculating the metrics that are sent to a calculation engine at the end of the time period according to some embodiments.

Flow analyzer 110 may calculate different metrics and send the calculations to server 114. It is noted that server 114 may also perform some or all of the calculations described, but network device 102 can perform the calculations without throughput impact. FIG. 8 depicts an example of calculating the metrics that are sent to calculation engine 112 at the end of the time period according to some embodiments. At 802, flow analyzer 110 calculates a first total recovery time for packets received by a node, such as node #1 104-1 or node #2 104-2. In some embodiments, flow analyzer 110 may perform a calculation for both node #1 104-1 and node #2 104-2, separately. At 804, flow analyzer 110 calculates a second total recovery time for packets sent by a node, such as node #1 104-1 or node #2 104-2.

Figure 9:
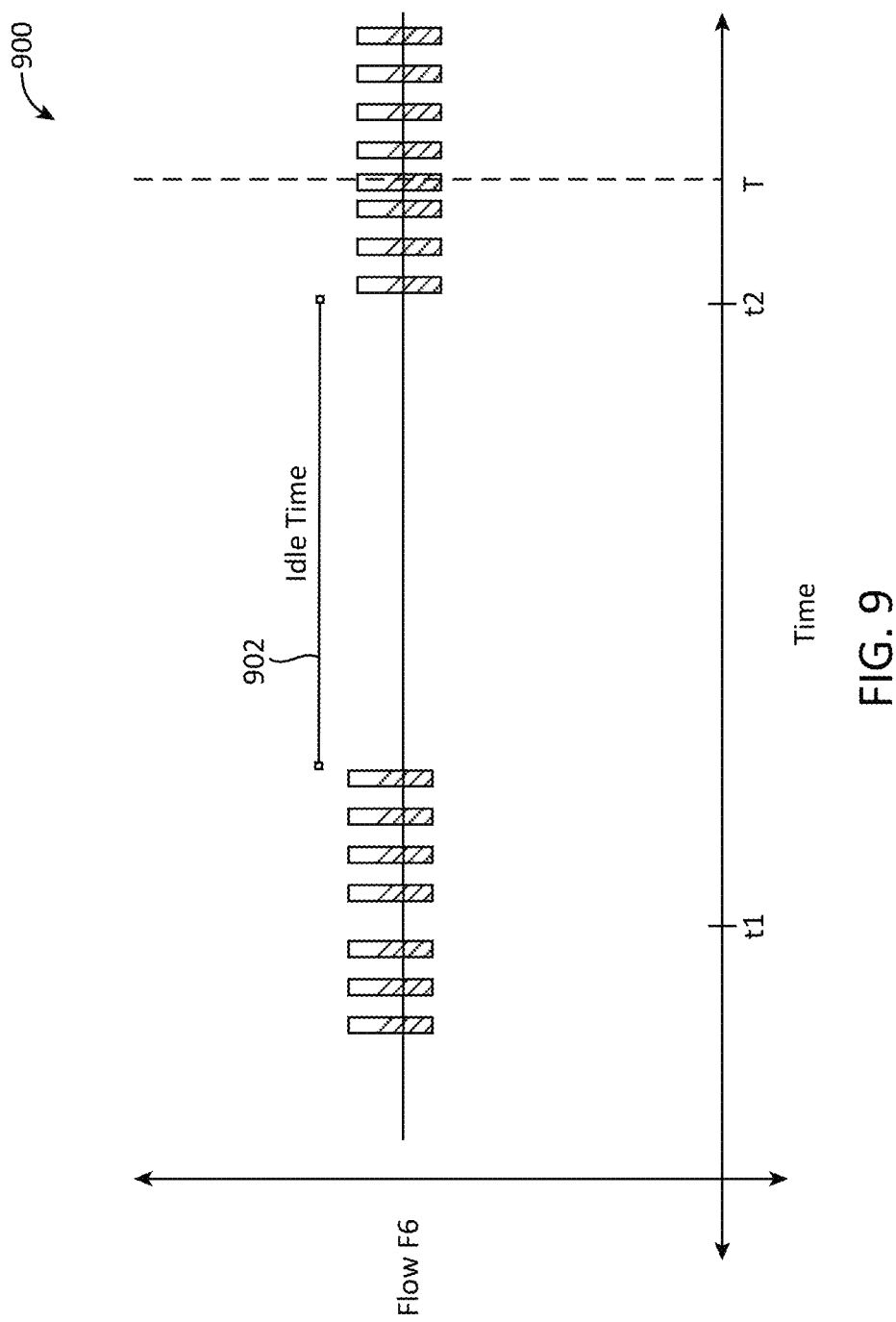
FIG. 9 depicts a chart of a flow according to some embodiments.

Then, at 806, flow analyzer 110 calculates an idle time. The idle time may be calculated as described above. At 808, flow analyzer 110 calculates an active time from a total time minus the idle time. In a flow, there may be some inter-packet gaps. For example, FIG. 9 depicts a graph 900 of a flow according to some embodiments. Between times t1 and t2, data is transmitted or received with some inter-packet gaps. However, at 902, there is an idle time. If flow analyzer 110 has not detected a duplicate acknowledgement message, flow analyzer 110 may classify an inter-packet gap as idle time if the time between the last packet received to a time of the new packet is received is greater than a time threshold.

At 810, flow analyzer 110 outputs the active time, the first total recovery time, and the second total recovery time. For example, flow analyzer 110 may send the information to calculation engine 112.

Calculation Engine

Calculation engine 112 may perform data aggregation or data analytics on the data received from flow analyzer 110. In some embodiments, calculation engine 112 may calculate the active time if flow analyzer 110 did not calculate the active time.

Calculation engine 112 may aggregate data for each application. In the aggregation, calculation engine 112 may summarize the active time and the recovery time. The active time is calculated as the flow time minus the idle time and the recovery time may be based on the first recovery time for received packets and the second recovery time based on transmitted packets. If a graph is output that includes a large amount of recovery time compared to the amount of active time, then a user can determine that the connection may be bad. However, if there is a large amount of active time with a low amount of recovery time, a user can determine that the network connection is good.

Additional Metrics

The above calculated the recovery time, but other metrics may also be calculated. For example, flow analyzer 110 may calculate the total data that is re-transmitted and the total number of packets that are re-transmitted. Flow analyzer 110 may use the expected acknowledgement number in the direction to perform the computation. For example, in some embodiments if the expected acknowledgement number in a direction is less than or equal to the sequence number plus the payload of a packet received in the opposite direction, then the network connection is operating properly. If that is not the case, flow analyzer 110 can determine that the packet has been re-transmitted if the duplicate acknowledgement message has already been received. Flow analyzer 110 may use a variable tx_dir_data_retransmitted to calculate the total data re-transmitted for a direction in which packets are transmitted. The total data re-transmitted may be the amount of payload that is re-transmitted.

Also, flow analyzer 110 may also keep track of a variable of the total re-transmitted packets for that direction. The total number of re-transmitted packets may be the count of the number of packets that are lost and have to be re-transmitted.

The following performs the above two calculations:

if *tx*_hole_detected==True:

if sequence+payload<*tx*_expected_*ack:*

*tx_dir*_data_retransmitted+=frame_length

*tx_dir*_total_*ret*_packets+=1

When a hole is detected, the frame length frame_length is added to the data retransmitted tx_dir_data_retransmitted variable. Also, the number of re-transmitted packets tx_dir_total_ret_ packets is incremented for each retransmitted packet.

Flow analyzer 110 may also send the start time of a duplicate acknowledgement number message and then the end time for when the lost packet or packets have been received. This may add more information for any data analytics that are needed. Also, flow analyzer 110 may calculate a percentage recovery time. For example, during a flow, there may be different recovery times that are calculated. Within a segment, flow analyzer may calculate the percentage of good network time and a percentage of recovery network time for a flow.

Conclusion

Accordingly, some embodiments calculate a recovery time based on acknowledgement messages that are received.

This provides a measurement of a metric that can be used to estimate the quality of a connection. Flow analyzer 110 uses information that is typically sent in packets in acknowledgement messages to measure the metric. Additionally, the amount of information that needs to be stored by flow analyzer 110 may measure the metric is not large and the calculations not complex and do not use a large amount of computing resources that may affect the operation of network device 102.

Embodiments

In some embodiments, a method includes: receiving, by a computing device, a first acknowledgement message that acknowledges receipt of a first packet; determining, by the computing device, whether the first acknowledgement message is a duplicate of a previous acknowledgement message that was sent previous to the first acknowledgement message; when the first acknowledgement message is the duplicate of the previous acknowledgement message: detecting, by the computing device, when a second acknowledge message is received that acknowledges receipt of a second packet; determining, by the computing device, that the second acknowledgement message is not the duplicate of the previous acknowledgement message; and measuring, by the computing device, a metric based on the detecting of the first acknowledgement message and the second acknowledgement message.

In some embodiments, the first acknowledgement message includes a first acknowledgement number, and determining whether the first acknowledgement message is the duplicate of the previous acknowledgement message comprises comparing the first acknowledgement number to a previous acknowledgement number that was included in the previous acknowledgement message.

In some embodiments, the first acknowledgement message is the duplicate of the previous acknowledgement message when the first acknowledgement number is equal to the previous acknowledgement number.

In some embodiments, the first acknowledgement message is not the duplicate of the previous acknowledgement message when the first acknowledgement number is equal to the previous acknowledgement number and first acknowledgement message is not equal to an expected acknowledgement number.

In some embodiments, the expected acknowledgement number is a value that is expected for the first acknowledgement number.

In some embodiments, the expected acknowledgement number is based on an amount of data sent in the first packet.

In some embodiments, measuring the metric includes: starting to measure the metric upon determining the first acknowledgement message is the duplicate of the previous acknowledgement message; and stopping the measuring of the metric when the second acknowledgement message is not the duplicate of the previous acknowledgement message.

In some embodiments, the metric measures a time based on when the first acknowledgement message is received and the second acknowledgement message is received.

In some embodiments, the metric measures data lost based on when the first acknowledgement message is received and the second acknowledgement message is received.

In some embodiments, the metric measures a number of retransmissions based on when the first acknowledgement message is received and the second acknowledgement message is received.

In some embodiments, the method further includes: outputting a first measurement for the metric, wherein the first measurement is used to quantify performance of a connection between a first node and a second node.

In some embodiments, a second measurement of when the connection is idle is calculated, and a third measurement is calculated based on the second measurement.

In some embodiments, the third measurement measures a first type of time based on an active time in a flow and the first measurement measures a second type of time based on idle time in a flow.

In some embodiments, the second measurement is measured based on interpacket gaps over a threshold that are considered when the flow is idle.

In some embodiments, the metric measures a time that is taken to recover from a lost packet that is sent from a first node to a second node and not received by the second node.

In some embodiments, a non-transitory computer-readable storage medium having stored thereon computer executable instructions, which when executed by a computing device, cause the computing device to be operable for: receiving a first acknowledgement message that acknowledges receipt of a first packet; determining whether the first acknowledgement message is a duplicate of a previous acknowledgement message that was sent previous to the first acknowledgement message; when the first acknowledgement message is the duplicate of the previous acknowledgement message: detecting when a second acknowledge message is received that acknowledges receipt of a second packet; determining that the second acknowledgement message is not the duplicate of the previous acknowledgement message; and measuring a metric based on the detecting of the first acknowledgement message and the second acknowledgement message.

In some embodiments, the first acknowledgement message includes a first acknowledgement number, and determining whether the first acknowledgement message is the duplicate of the previous acknowledgement message comprises comparing the first acknowledgement number to a previous acknowledgement number that was included in the previous acknowledgement message.

In some embodiments, the first acknowledgement message is the duplicate of the previous acknowledgement message when the first acknowledgement number is equal to the previous acknowledgement number.

In some embodiments, the first acknowledgement message is not the duplicate of the previous acknowledgement message when the first acknowledgement number is equal to the previous acknowledgement number and first acknowledgement message is not equal to an expected acknowledgement number.

In some embodiments, measuring the metric comprises: starting to measure the metric upon determining the first acknowledgement message is the duplicate of the previous acknowledgement message; and stopping the measuring of the metric when the second acknowledgement message is not the duplicate of the previous acknowledgement message.

In some embodiments, an apparatus comprises: one or more computer processors; and a computer-readable storage medium comprising instructions for controlling the one or more computer processors to be operable for: receiving a first acknowledgement message that acknowledges receipt of a first packet; determining whether the first acknowledgement message is a duplicate of a previous acknowledgement message that was sent previous to the first acknowledgement message; when the first acknowledgement message is the duplicate of the previous acknowledgement message:

detecting when a second acknowledge message is received that acknowledges receipt of a second packet; determining that the second acknowledgement message is not the duplicate of the previous acknowledgement message; and measuring a metric based on the detecting of the first acknowledgement message and the second acknowledgement message.

System

Figure 10:
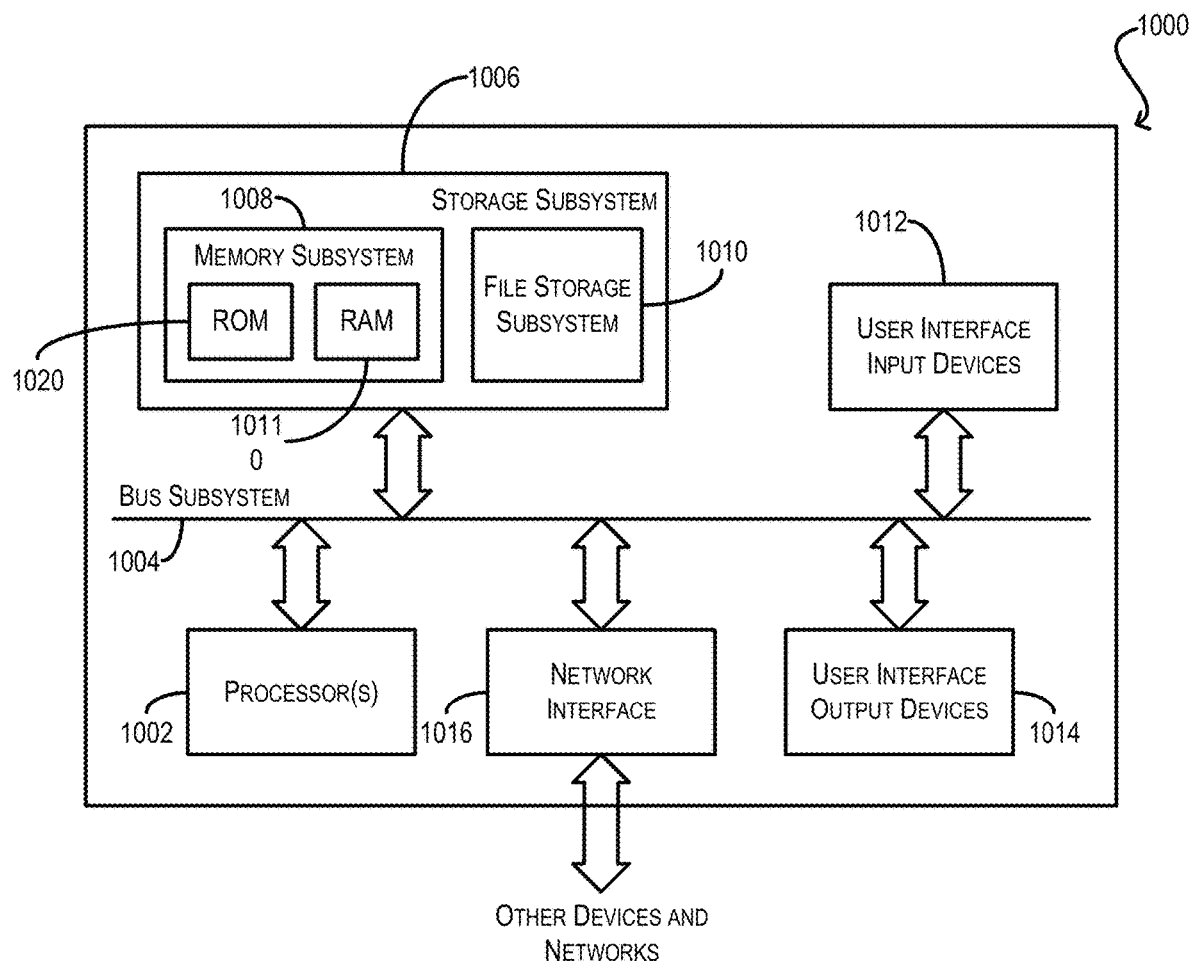
FIG. 10 depicts an example computer system according to some embodiments.

FIG. 10 depicts an example computer system 1000 according to some embodiments. Computer system 1000 can be used to implement any of the computing devices, systems, or servers described in the foregoing disclosure. As shown in FIG. 10, computer system 1000 includes one or more processors 1002 that communicate with a number of peripheral devices via a bus subsystem 1004. These peripheral devices include a storage subsystem 1006 (comprising a memory subsystem 1008 and a file storage subsystem 1010), user interface input devices 1012, user interface output devices 1014, and a network interface subsystem 1016.

Bus subsystem 1004 can provide a mechanism for letting the various components and subsystems of computer system 1000 communicate with each other as intended. Although bus subsystem 1004 is shown schematically as a single bus, alternative embodiments of the bus subsystem can utilize multiple buses.

Network interface subsystem 1016 can serve as an interface for communicating data between computer system 1000 and other computer systems or networks. Embodiments of network interface subsystem 1016 can include, e.g., an Ethernet card, a Wi-Fi and/or cellular adapter, a modem (telephone, satellite, cable, ISDN, etc.), digital subscriber line (DSL) units, and/or the like.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Storage subsystem 1006 includes a memory subsystem 1008 and a file/disk storage subsystem 1010. Subsystems 1008 and 1010 represent non-transitory computer-readable storage media that can store program code and/or data that provide the functionality of embodiments of the present disclosure.

Memory subsystem 1008 includes a number of memories including a main random access memory (RAM) 1018 for storage of instructions and data during program execution and a read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a first acknowledgement message that acknowledges receipt of a first packet, the first acknowledgement message including a first acknowledgement number;
   determining, by the computing device, whether the first acknowledgement message is a duplicate of a previous acknowledgement message that was sent previous to the first acknowledgement message, the previous acknowledgement message including a previous acknowledgement number and the determining includes:
      comparing the first acknowledgement number to the previous acknowledgement number;
      comparing the first acknowledgement number to an expected acknowledgement number; and
      determining the first acknowledgement message is a duplicate of the previous acknowledgement message when the first acknowledgement number is equal to the previous acknowledgement number and first acknowledgement number is not equal to the expected acknowledgement number; and
   when the first acknowledgement message is the duplicate of the previous acknowledgement message:
      receiving, by the computing device, a second acknowledgement message that acknowledges receipt of a second packet;
      determining, by the computing device, that the second acknowledgement message is not the duplicate of the previous acknowledgement message based on a second acknowledgement number included in the second acknowledgement message and the previous acknowledgement number;
      identifying an application identifier that identifies an application specific flow; and measuring, by the computing device, an application performance metric based on the first acknowledgement message, the second acknowledgement message, and the application identifier,
wherein the application performance metric measures a time based on when the first acknowledgement message is received and the second acknowledgement message is received.

2. The method of claim 1, wherein the expected acknowledgement number is a value that is expected for the first acknowledgement number.

3. The method of claim 1, wherein the expected acknowledgement number is based on an amount of data sent in the first packet.

4. The method of claim 1, wherein the application performance metric measures an amount of data lost based on when the first acknowledgement message is received and when the second acknowledgement message is received.

5. The method of claim 1, wherein the application performance metric measures a number of retransmissions based on when the first acknowledgement message is received and the second acknowledgement message is received.

6. The method of claim 1, further comprising:
outputting a first measurement for the application performance metric, wherein the first measurement is used to quantify performance of a connection between a first node and a second node.

7. The method of claim 6, wherein:
a second measurement of when the connection is idle is calculated, and
a third measurement is calculated based on the second measurement.

8. The method of claim 7, wherein the third measurement measures a first type of time based on an active time in a flow and the first measurement measures a second type of time based on idle time in a flow.

9. The method of claim 8, wherein the second measurement is measured based on interpacket gaps over a threshold that are considered when the flow is idle.

10. The method of claim 1, wherein the application performance metric measures a time that is taken to recover from a lost packet that is sent from a first node to a second node and not received by the second node.

11. A non-transitory computer-readable storage medium having stored thereon computer executable instructions, which when executed by a computing device, cause the computing device to be operable for:
receiving a first acknowledgement message that acknowledges receipt of a first packet, the first acknowledgement message including a first acknowledgement number;
determining whether the first acknowledgement message is a duplicate of a previous acknowledgement message, the previous acknowledgement message including a previously acknowledgement number and the determining including:
comparing the first acknowledgement number to the previous acknowledgement number;
comparing the first acknowledgement number to an expected acknowledgement number; and
determining the first acknowledgement message is the duplicate of the previous acknowledgement message when the first acknowledgement number is equal to the previous acknowledgement number and first acknowledgement number is not equal to the expected acknowledgement number;
when the first acknowledgement message is the duplicate of the previous acknowledgement message:
receiving, by the computing device, a second acknowledgement message that acknowledges receipt of a second packet;
determining, by the computing device, that the second acknowledgement message is not the duplicate of the previous acknowledgement message based on a second acknowledgement number included in the second acknowledgement message and the previous acknowledgement number;
identifying an application identifier that identifies an application specific flow; and
measuring, by the computing device, an application performance metric based on the first acknowledgement message, the second acknowledgement message, and the application identifier,
wherein the application performance metric measures a time based on when the first acknowledgement message is received and the second acknowledgement message is received.

12. The non-transitory computer-readable storage medium of claim 11, wherein the computer executable instructions, which when executed by the computing device, cause the computing device to be further operable for:
starting measuring of the application performance metric in response to determining the first acknowledgement message is a duplicate of the previous acknowledgement message; and
stopping measuring of the application performance metric in response to determining the second acknowledgement message is not a duplicate of the previous acknowledgement message.

13. An apparatus comprising:
one or more computer processors; and
a computer-readable storage medium comprising instructions for controlling the one or more computer processors to be operable to:
receive a first acknowledgement message that acknowledges receipt of a first packet, the first acknowledgement message including a first timestamp and a first acknowledgement number;
compare the first acknowledgement number to a previous acknowledgement number of a previous acknowledgement message that was sent previous to the first acknowledgement message;
compare the first acknowledgement number to an expected acknowledgement number;
determine the first acknowledgement message is a duplicate of the previous acknowledgement message when the first acknowledgement number is equal to the previous acknowledgement number and the first acknowledgement number is not equal to the expected acknowledgement number; and
when the first acknowledgement message is the duplicate of the previous acknowledgement message:
receive a second acknowledgement message that acknowledges receipt of a second packet, the second acknowledgement message including a second timestamp and a second acknowledgement number;
determine that the second acknowledgement message is not the duplicate of the previous acknowledgement message based on the first and second acknowledgement numbers;
identify an application identifier that identifies an application specific flow; and measure an application recovery time based on the first timestamp of the first acknowledgement message, the second timestamp of the second acknowledgement message, and the application identifier.

14. The apparatus of claim 13, wherein measuring the recovery time comprises measuring a difference between the second timestamp and the first timestamp.

15. The apparatus of claim 13, wherein the computer-readable storage medium further comprises instructions for controlling the one or more computer processors to be further operable to:
start measuring of the recovery time in response to determining the first acknowledgement message is a duplicate of the previous acknowledgement message; and
stop measuring of the recovery time in response to determining the second acknowledgement message is not a duplicate of the previous acknowledgement message.

16. The apparatus of claim 13, wherein the computer-readable storage medium further comprises instructions for controlling the one or more computer processors to be further operable to measure data lost based on when the first acknowledgement message is received and the second acknowledgement message is received.

17. The apparatus of claim 13, wherein the apparatus comprises a network device that receives the first and second packets from a transmitting node and communicates the first and second packets to a receiving node, and wherein the network device receives acknowledgement messages from the receiving node and communicates these acknowledgement messages to the transmitting node.

18. The method of claim 1, wherein measuring the application performance metric further comprises:
starting the measuring of the application performance metric in response to determining the first acknowledgement message is a duplicate of the previous acknowledgement message; and
stopping the measuring of the metric in response to determining the second acknowledgement message is not a duplicate of the previous acknowledgement message.

* * * * *